(12) United States Patent
Valentine et al.

(10) Patent No.: US 12,535,504 B2
(45) Date of Patent: Jan. 27, 2026

(54) TEST AND MEASUREMENT INSTRUMENT WITH REMOVABLE BATTERY PACK

(71) Applicant: Tektronix, Inc., Beaverton, OR (US)

(72) Inventors: Chris A. Valentine, Portland, OR (US); Prashanth Thota, Tigard, OR (US); Steve U. Reinhold, Hillsboro, OR (US); Jonathan D. Clem, Hillsboro, OR (US); Timothy Keil, Portland, OR (US)

(73) Assignee: TEKTRONIX, INC., Beaverton, OR (US)

( * ) Notice: Subject to any disclaimer, the term of this patent is extended or adjusted under 35 U.S.C. 154(b) by 0 days.

(21) Appl. No.: 17/944,924

(22) Filed: Sep. 14, 2022

(65) Prior Publication Data

US 2023/0077447 A1 Mar. 16, 2023

Related U.S. Application Data

(60) Provisional application No. 63/244,176, filed on Sep. 14, 2021.

(51) Int. Cl.
*G01R 13/02* (2006.01)
*G01R 31/3835* (2019.01)

(52) U.S. Cl.
CPC ..... *G01R 13/0218* (2013.01); *G01R 31/3835* (2019.01)

(58) Field of Classification Search
CPC .......... G01R 13/0218; G01R 31/3835
See application file for complete search history.

(56) References Cited

U.S. PATENT DOCUMENTS

2019/0064233 A1* 2/2019 Grimm ............. G01R 13/0218
2021/0084207 A1* 3/2021 Tucker ................ H04N 23/52
(Continued)

FOREIGN PATENT DOCUMENTS

CN       202093151        12/2011
CN       202093151 U  *  12/2011
(Continued)

OTHER PUBLICATIONS

JP,05-115128A Machine Translation, STIC (Year: 1993).*
(Continued)

*Primary Examiner* — Minh Q Phan
(74) *Attorney, Agent, or Firm* — Miller Nash LLP; Andrew J. Harrington

(57) ABSTRACT

A test system includes a test and measurement instrument having one or more inputs for receiving one or more signals to be measured or tested, a display for outputting measurement results or test results, one or more processors for operating the instrument, a chassis housing the instrument, a power connection to receive power for powering the one or more processors from a wall connection. The test system further includes an external battery pack separate from the test and measurement instrument and structured to mechanically and electrically couple to and decouple from the test and measurement instrument, the external battery pack including a DC power source for powering the one or more processors. The test and measurement instrument includes no batteries or other power storage device for powering the one or more processors within the chassis of the instrument.

9 Claims, 8 Drawing Sheets

(56) References Cited

U.S. PATENT DOCUMENTS

2022/0166089 A1* 5/2022 Wagoner ............... H02J 7/36
2023/0006295 A1* 1/2023 Lee ............... H01M 10/4257

FOREIGN PATENT DOCUMENTS

| CN | 208188291 | 12/2018 | | |
|----|-----------|---------|---|---|
| JP | 05-115128 | 5/1993 | | |
| JP | 2003-028939 | 1/2003 | | |
| JP | 2019-164153 | 9/2019 | | |
| WO | WO-2018050981 A1 * | 3/2018 | ............ | B25F 5/02 |

OTHER PUBLICATIONS

Korean Intellectual Property Office, International Search Report and Written Opinion for International Application No. PCT/US2022/043524, Jan. 3, 2023, 9 pages, Daejeon, Republic of Korea.

* cited by examiner

TEST AND MEASUREMENT INSTRUMENT WITH REMOVABLE BATTERY PACK

CROSS-REFERENCE TO RELATED APPLICATIONS

This disclosure claims benefit of U.S. Provisional Application No. 63/244,176, titled "TEST AND MEASUREMENT INSTRUMENT WITH REMOVABLE BATTERY PACK MODULE," filed on Sep. 14, 2021, the disclosure of which is incorporated herein by reference in its entirety.

TECHNICAL FIELD

This disclosure relates to test and measurement instruments, and more particularly to a portable test and measurement instrument, such as a handheld oscilloscope.

BACKGROUND

Test and measurement instruments, such as oscilloscopes, have traditionally been rather large, bench top instruments connected to wall power. These bench top instruments have been bulky and cumbersome, taking up a large amount of space on work benches and making relocation difficult due to weight. Consequently, test and measurement instruments have primarily been set up at workstations and left alone, allowing for no portability. Over time, instrument manufacturers have been able to reduce the size and weight of instruments to produce portable and handheld instruments to accommodate a need for instruments that can be used in the field, away from a desktop. Some test and measurement instrument manufacturers have introduced battery-powered, "tablet-like" oscilloscopes with flat form factors, consistent with developments seen in the tablet computing device market. These tablet oscilloscopes have integrated, built-in batteries that cannot be removed.

A built-in battery in a typical tablet computing device is expected and acceptable for that type of device because tablets are most often used when disconnected from wall power. But test and measurement instruments are not tablet computing devices. Research indicates that 70% of test and measurement instrument users will use an instrument in a setting where the instrument can be connected to wall power, even though portability is still important to those users. Furthermore, batteries for test and measurement instruments are larger and heavier than those for typical tablet computing devices, so battery-powered instruments still present size and weight difficulties for users. Accordingly, many users are attracted to the portability of battery-powered devices for field settings but primarily need bench top devices that minimize longstanding size and weight concerns. The improvements seen in tablet computing devices are consequently not the best solutions for the test and measurement instrument market. Rather, improvements that allow for both portability for the field and reduced size for the lab are needed.

Embodiments of this disclosure address these and other limitations of existing devices.

DESCRIPTION

Figure 1:
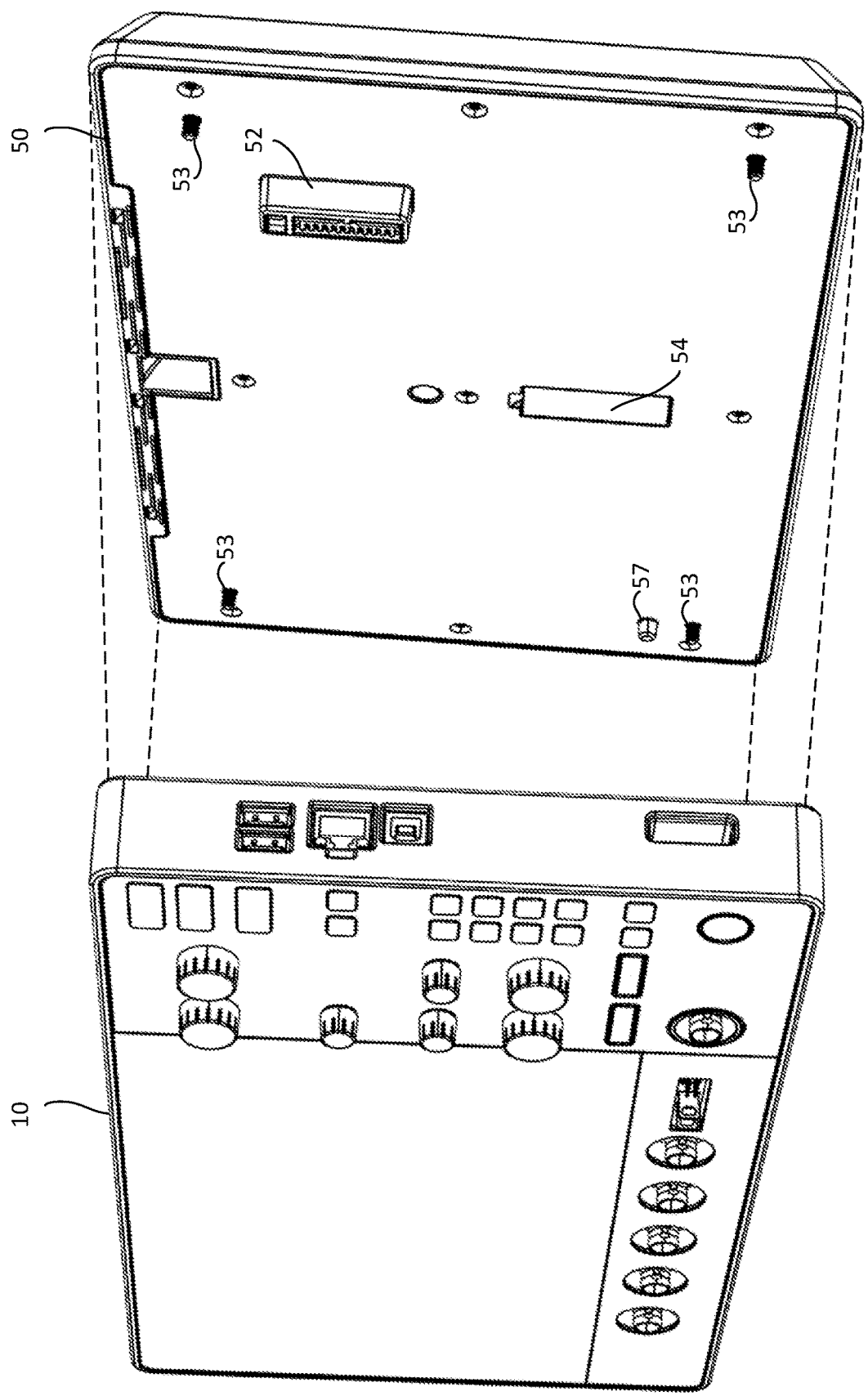
FIG. 1 is an exploded, front perspective view of a test and measurement instrument and an optional, removable battery pack for powering the instrument according to embodiments of the disclosure.

FIG. 1 is an exploded, front perspective view of a test and measurement instrument 10 and an optional, removable battery pack 50 for powering the instrument according to embodiments of the disclosure. As described above, most test and measurement instruments, such as oscilloscopes, are used in a setting where the instrument can be connected through a cord to wall power to power the instrument. Typical wall power is provided by an AC (Alternating Current) signal operating between 110-240 Volts and 50-60 Hz, depending on local power standards.

Embodiments of the invention provide a power source for powering the instrument 10 in addition to wall power, the additional source being the removable battery pack 50. The battery pack 50 may be mechanically and electrically attached to the instrument 10 or removed from the instrument when it is not desired. When attached, power from batteries or cells within the battery pack 50, described below, power the instrument. Thus, when the battery pack 50 is attached to the instrument 10, the instrument may be disconnected from wall power, and it becomes a portable test and measurement instrument. And, as described below, unlike traditional battery-powered devices, the test and measurement instrument 10 itself does not include batteries or any energy storage devices to power the device separate from the battery pack 50. In other words, there are no batteries within the confines of a case or chassis of the instrument 10 to provide power to the instrument. Instead, the only batteries within the instrument 10 perform functions other than powering the instrument, such as a battery to power a continuous date/time circuit. This cooperation between the instrument 10 and its removable battery pack 50 to provide external power to the instrument results in an instrument that is very compact and lightweight, as the instrument is manufactured without the weight and bulk of power supply batteries. Thus, for the users who always couple the instrument 10 to wall power, the instrument is as compact and light as possible, because batteries are not included within the instrument 10. And those users who do wish to use the instrument 10 in a portable manner simply couple the battery pack 50 to provide the operating power. The instrument 10 and removable battery pack 50 include many features, which are described in detail below.

Figure 2:
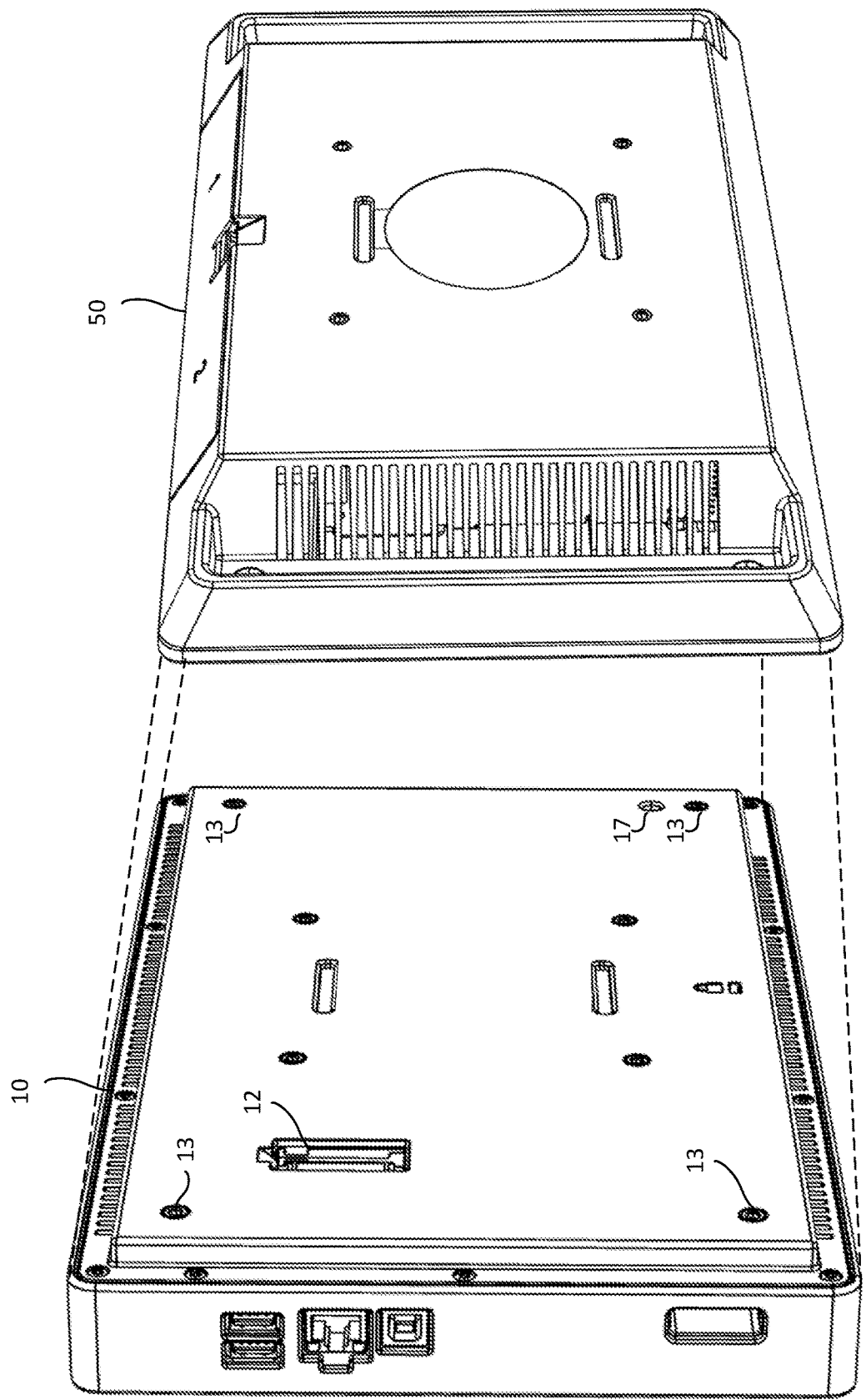
FIG. 2 is an exploded, rear perspective view of the test and measurement instrument and removable battery pack of FIG. 1, according to embodiments of the disclosure.

As shown in FIGS. 1 and 2, the removable battery pack 50 may be installed to the instrument by coupling the devices together, both physically and electrically. A locating pin 57 on the battery pack is indexed to a receiver 17 on a rear surface of the instrument 10. The receiver 17 may include a form of mechanical attachment to the locating pin 57, but in other cases the receiver 17 is merely a recessed hole formed in the rear panel of the instrument 10. In the illustrated embodiment, the locating pin 57 is located diagonally across the front main surface of the battery pack 50 from an electrical interface 52, described below. Although only one locating pin 57 is illustrated in FIG. 1, any number of locating pins may be formed extending from the surface of the battery pack 50, to be received in respective receivers 17 of the instrument 10. Also illustrated in FIG. 1 are mechanical attachments 53, which in the illustrated embodiment are screws, which mechanically fasten the battery pack 50 to the instrument 10. Threaded receivers 13 are formed in a rear surface of the instrument 10 to receive the screws, as illustrated in FIG. 1.

The electrical interface 52 (FIG. 1) of the battery pack 50 provides an electrical connection between the battery pack and the instrument 10. This electrical interface 52 provides power between the instrument 10 and the battery pack 50 in both directions. The battery pack 50 may provide power to the instrument 10, or, when the instrument is also coupled to wall power, a charging circuit may provide power to the battery pack to charge the cells within. Further, the electrical interface 52 includes a data communication interface which is used to communicate information between the instrument 10 and the battery pack 50.

The instrument 10 includes an electrical receiver 12, illustrated in FIG. 2, which mates with the electrical interface 52 of the battery pack 50 when it is coupled to the instrument. The electrical receiver 12 may include a ribbon connection back to the internal components of the instrument 10. In some embodiments, a ground connection of the electrical interface 52 is the first electrical contact to the electrical receiver 12 when the battery pack 50 is attached to the instrument 10. A cover to the electrical receiver may be removed from the electrical receiver 12 and stored in a temporary storage 54 of the battery pack 50, illustrated in FIG. 1. In the illustrated embodiment, the direct connection between the electrical interface 52 of the battery pack 50 and the electrical receiver 12 of the instrument means no cables are required to connect the battery pack to the instrument. Of course, although it may not always be desirable, in other embodiments a cable between the battery pack 50 and instrument 10 may be used in place of or in addition to the electrical interface 52 and receiver 12.

Figure 3:
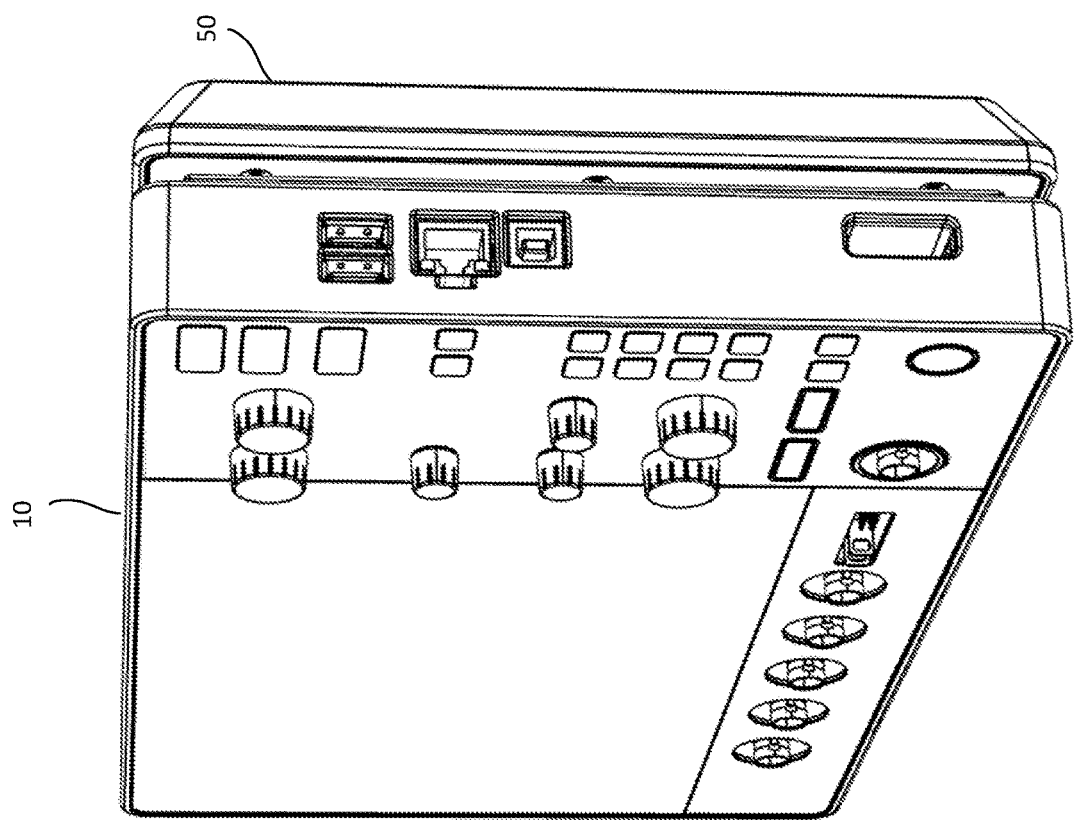
FIG. 3 is a side perspective view of the test and measurement instrument of FIG. 1 illustrating the removable battery packed installed and attached to the instrument, according to embodiments of the disclosure.

FIG. 3 shows the instrument 10 physically and electrically coupled to the removable battery pack 50. As can be seen in FIG. 3, including batteries to power the instrument in a separate battery pack 50 instead of within the instrument itself allows the instrument to be formed with a much thinner profile than had batteries been included in the instrument. Also, the weight of the instrument 10 is significantly less, by approximately 50%, than had the batteries been included within its chassis. When the instrument 10 is used in absence of the battery pack 50, the instrument 10 is relatively flat and lightweight. The instrument 10 in such a configuration has a convenient form factor size. In this state, the instrument 10 is easily moveable and takes up minimal space on a bench top, addressing limitations previously experienced in the lab setting. Then, when the battery pack is coupled to the instrument 10, as illustrated in FIG. 3, the combined device allows the instrument to be conveniently used in the field, away from wall power, as the combined device provides its own power to the instrument.

Figure 4:
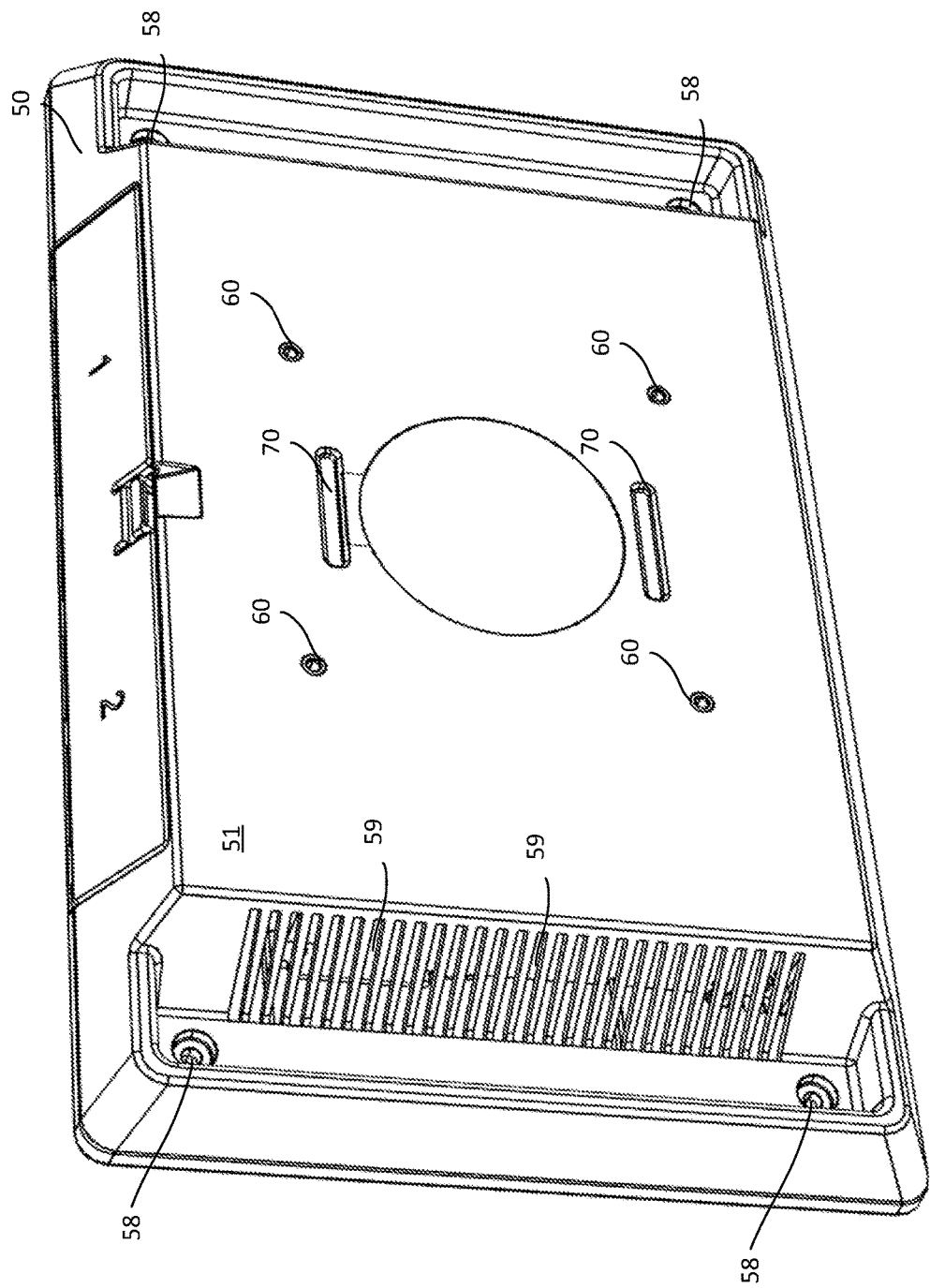
FIG. 4 is a rear perspective view of the removable battery pack of FIG. 1, showing additional details according to embodiments of the disclosure.

FIG. 4 is a rear perspective view of the removable battery pack 50 of FIG. 1, showing additional details according to embodiments of the disclosure. For example, a rear surface 51 of the battery pack 50 includes one or more mounting points 60, which may be spaced in a Video Electronics Standards Association (VESA)-compatible pattern, such as one according to the VESA Flat Display Mounting Interface (FDMI) standard, for mounting the battery pack to a stand, holder, or other VESA-compatible mounting accessory. Since the instrument 10 also includes VESA mounts, as described above, the instrument 10 may be mounted to a stand, holder, or other VESA-compatible accessory whether the battery pack 50 is removed or installed. The battery pack 50 may also include any number of keying slots 70 to assist with indexing a stand, holder, or other VESA-compatible accessory and provide a relatively tight connection to the battery pack 50.

FIG. 4 also illustrates a collection of mounting holes 58, in this embodiment located near the corners, through which the attachments (53, FIG. 1) or other fastener may be used to mechanically connect through the battery pack 50 to the instrument 10. When mechanically connected in such a manner, the instrument 10 and battery pack become a single unit for easy portability.

A venting structure 59, such as the illustrated fins, allows any heat that may be generated by the battery pack 50 to vent to the outside, to provide a cooling path for the battery pack. Heat may be generated when the cells in the battery pack 50 are being recharged, for example, or may be generated during regular instrument operation.

Figure 5:
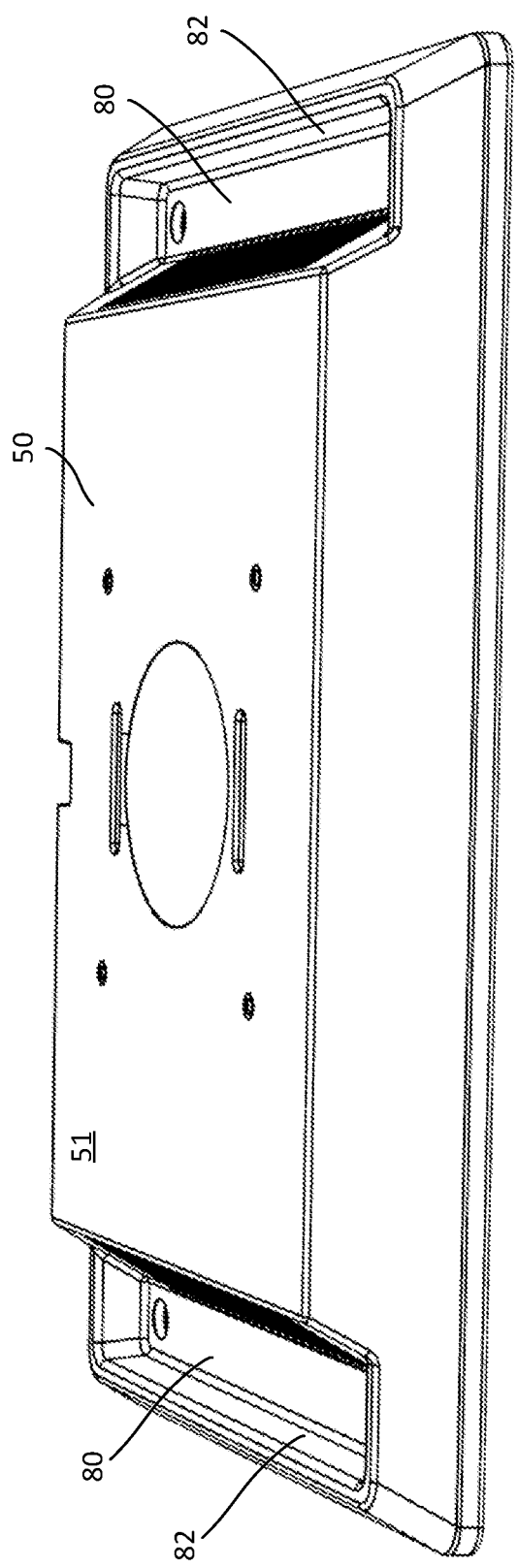
FIG. 5 is another rear perspective view of the removable battery pack of FIG. 1, from a lower angle than in FIG. 4, illustrating integrated hand grips, according to embodiments of the invention.

As depicted in FIGS. 4 and 5, the battery pack 50 also includes integrated hand grips 80, which are constructed as recesses at each of the left and right edges of the rear surface 51 of the battery pack 50. In an example configuration, the recesses for the hand grips 80 are set at a depth to optimize comfort and ease holding the instrument for the user. In one embodiment, the depth of the hand grips is approximately between 14 mm and 28 mm, and preferably no less than 14 mm. Also, as depicted in FIGS. 4 and 5, the height of the hand grips 80 extends approximately the same height as the battery pack 50 itself, although in other embodiments the height of the hand grips may have different sizes than illustrated in these figures. In some embodiments, the hand grips 80 could include undercuts in sidewalls 82, which are formed at a concave or acute angle to a bottom surface of the hand grips. In either case, with or without undercuts, the combination of the sidewalls 82 and recesses that form the hand grips 80 provide a structure that makes it easy for a human hand to grip the hand grips 80, and by extension the battery pack 50. Thus, by inserting fingers in the hand grips 80 and closing a fist, and possibly holding a thumb on a front surface of the instrument 10, a user can readily hold and move the instrument 10 and attached battery pack 50.

Figure 6:
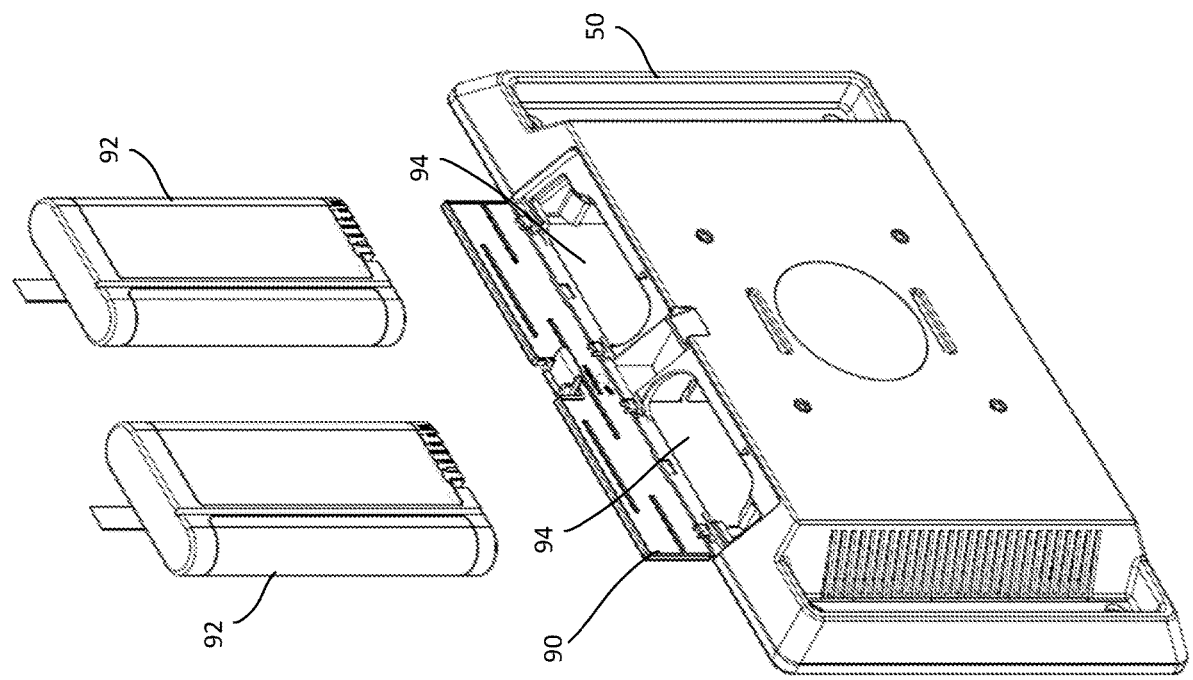
FIG. 6 is a further rear perspective view of the removable battery pack of FIG. 1 illustrating battery cells and receiving slots for the cells, according to embodiments.

FIG. 6 illustrates that, in some embodiments, the removable battery pack 50 may include a battery pack access panel 90, which allows insertion and removal of battery cells 92. In the illustrated embodiment, the removable battery pack 50 includes two slots 94, each for accommodating one of the battery cells 92. The cells 92 and slots 94 are keyed so that the cells may only be inserted in the proper orientation in which they make electrical contact with circuitry in the battery pack 50. In some embodiments, the battery cells 92 may be rechargeable Lithium Ion batteries, although in other embodiments other types of cells may be used. Rechargeable batteries often have long but finite lifetimes, so allowing the battery cells 92 to be periodically replaced adds functionality and longevity to the battery pack 50. After the cells 92 are inserted, the access panel 90 is closed and latched to keep the cells 92 in place during operation.

In some embodiments, the battery cells 92 may be hot-swappable, meaning that one battery cell 92 may be removed while the other is in operation. A user may wish to remove one of the battery cells 92 to reduce weight, for example. Or, a user may wish to charge one of the cells on an external charger (not illustrated) while the second cell operates the instrument. Typically, though, the user will have both battery cells 92 installed in the battery pack 50 for a longer battery-powered run time.

In general, it is preferable that the user remove both battery cells 92 from the battery pack 50 before attaching the battery pack to the instrument 10. Removing the battery cells 92 from the battery pack ensures that no stray voltage is applied to the instrument 10 when the electrical receiver 12 (FIG. 2) couples to the electrical interface 52 of the battery pack 50 (FIG. 1). A protection circuit, described below, may be included in the battery pack 50 to prevent damage to the instrument when the battery pack is attached to the instrument with the cells 92 already installed.

Figure 7:
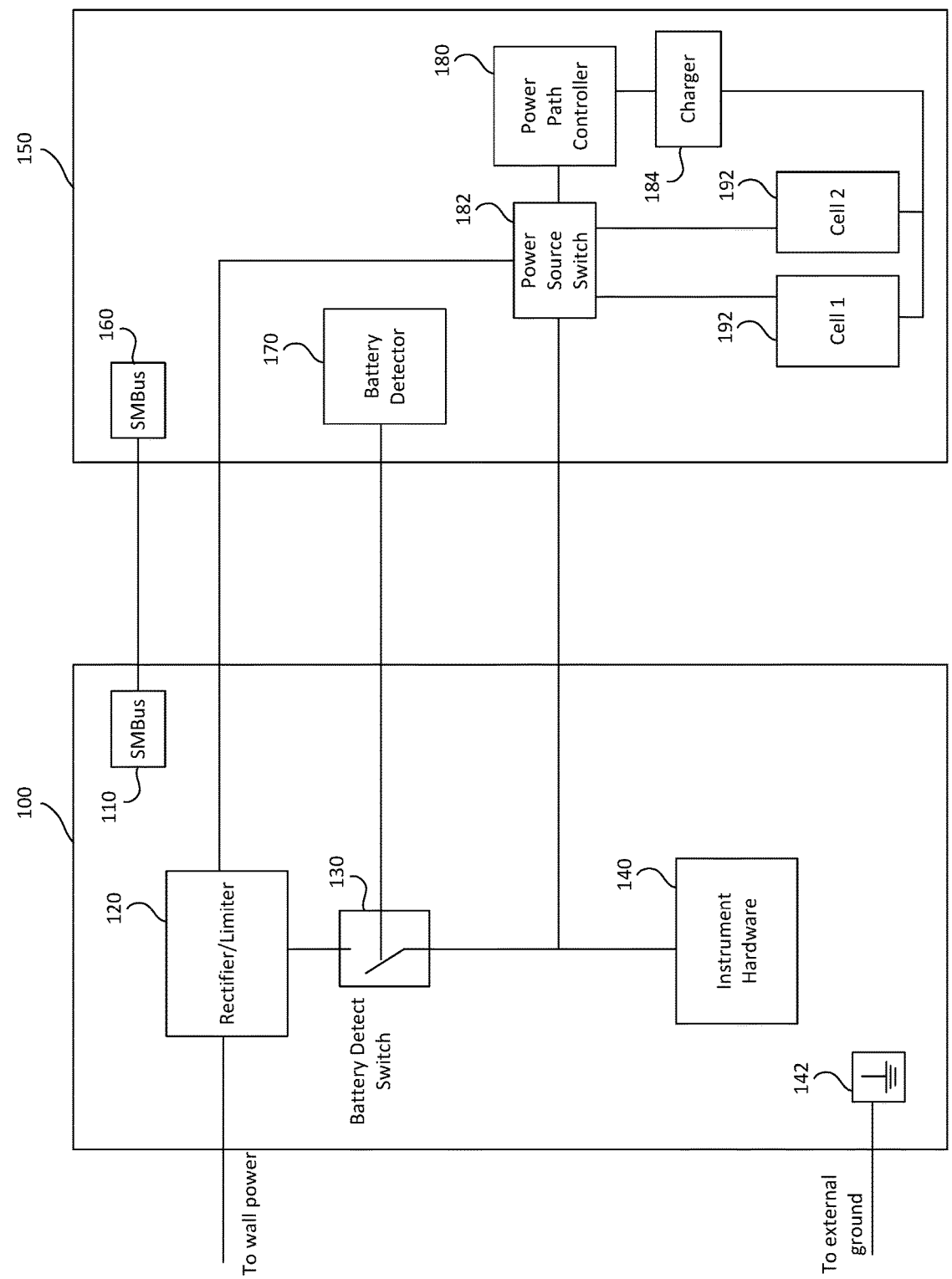
FIG. 7 is a functional block diagram illustrating power and communication connections between the test and measurement instrument and removable battery pack of FIG. 1, according to embodiments of the disclosure.

FIG. 7 is a functional block diagram illustrating power, communication, and safety connections between an instrument 100, which may be an example embodiment of the instrument 10 described above, and the battery pack 150, which may be an example embodiment of the battery pack 50. As described above, the power and communication connections between these two devices are conducted through the electrical connections between the electrical interface 52 of the battery pack 50 and the electrical receiver 12 of the instrument 10, or some other electrical interface.

Data communications between the instrument 100 and battery pack 150 may be carried on a communication bus, such as the defined SMBus used in smart battery networks. In FIG. 7, the data communication is generalized to two SMBus nodes, node 110 on the instrument 100 and node 160 on the battery pack 150. In application, however, there may be many components coupled to the SMBus, such as a battery charger circuit, system host, and cells themselves, for instance. In FIG. 7, it can be assumed that all illustrated components may communicate with one another through the SMBus or through other communication channels.

For power routing and management, the instrument 100 is coupled through a rectifier/limiter 120 to wall power. The rectifier limiter 120 converts wall power to Direct Current (DC) voltage, and limits it to a particular operating voltage, such as 20 Volts or 24 Volts. In some embodiments, either the rectifier or limiter functions of the rectifier/limiter 120 may be performed in a device, separate from the instrument 100, which is located between the instrument and the AC wall power. In such a case, then the instrument 100 receives DC power, with the source of such DC power originally from the wall AC connection.

A battery detect switch 130 receives a signal from a battery detector 170 on the battery pack 150, which in one embodiment is a voltage divider circuit that monitors a voltage, if any, of battery cells 192. If the battery detector 170 determines that no battery cells 192 are inserted into the battery pack 150, or that any cells 192 are sufficiently depleted, then the battery detect switch 130 is closed, and the power from the rectifier/limiter 120 is fed directly to the instrument hardware, and the instrument 100 operates solely on power from wall power, and not from the battery pack 150.

If instead the battery detector 170 determines that any cells 192 inserted into the battery pack 150 do have enough power to operate the instrument hardware 140, then the battery detect switch 130 is caused to be opened, and the power to operate the instrument hardware comes from the battery pack 150.

Although referred to as a battery detector 170, the detector 170 also determines whether the battery pack 150 is electrically coupled to the instrument 100. If so, the detector 170 informs both the instrument and the battery pack 150 that they are connected to one another. Such notice may be communicated over the SMBus.

A power path controller 180 determines the power source to be supplied to the instrument 100. For example, if the cells 192 are fully charged, then a power path controller 180 causes a power source switch 182 to route power from one of the cells 192 to operate the instrument hardware 140. When one of the cells becomes depleted, or its charge falls below the other cell, the power path controller may cause the power source switch to route power from the other of the cells 192. In some embodiments power may be routed from both cells 192 to the instrument 100. Also, it is possible for the battery detector 170 to recognize that cells 192 are inserted into the battery pack 150 but lack sufficient voltage to drive the instrument hardware 140. In such a case, the power path controller 180 causes power received from the instrument 100 to be routed back in a circuitous path through the power source switch 182 and back to the instrument 100 to power the instrument hardware 140. By operating in such a manner, the battery pack 150 actually controls most of the power routing between the various power sources and the instrument 100 when the battery pack is connected to the instrument.

Also coupled to the power path controller 180 is a battery charging circuit 184, which functions to charge the cells 192 when either or both of the cells require charging. The power to charge the cells comes from the rectifier/limiter 120 of the instrument 100. As mentioned above, it is also possible to remove the cells 192 from the battery pack 150 and charge them through an external battery charger.

Data communication on the SMBus allows the instrument 100 and the battery pack 150 to communicate with one another, so that the instrument 100 always knows the details of the power management system. These details may be communicated to the user of the instrument 100, such as by showing a display of power status to the user on a user interface, such as a power status screen. Information that may displayed to the user includes whether either or both cells 192 are inserted into the battery pack 150, a remaining charge of the cells 192, as well as a predicted time period until the cells are depleted or fully charged. The status display may also show, for example, a power cord when the battery pack 150 is not coupled to the instrument 100, and is coupled to wall power.

An external ground circuit 142 in the instrument 100 may be used to couple the instrument to an external ground through a grounding cable. Including a ground connection through the ground circuit 142 may help to prevent a user from receiving an electric shock through a case or chassis of the instrument 100 that could happen were the instrument not coupled to an electric ground.

Figure 8:
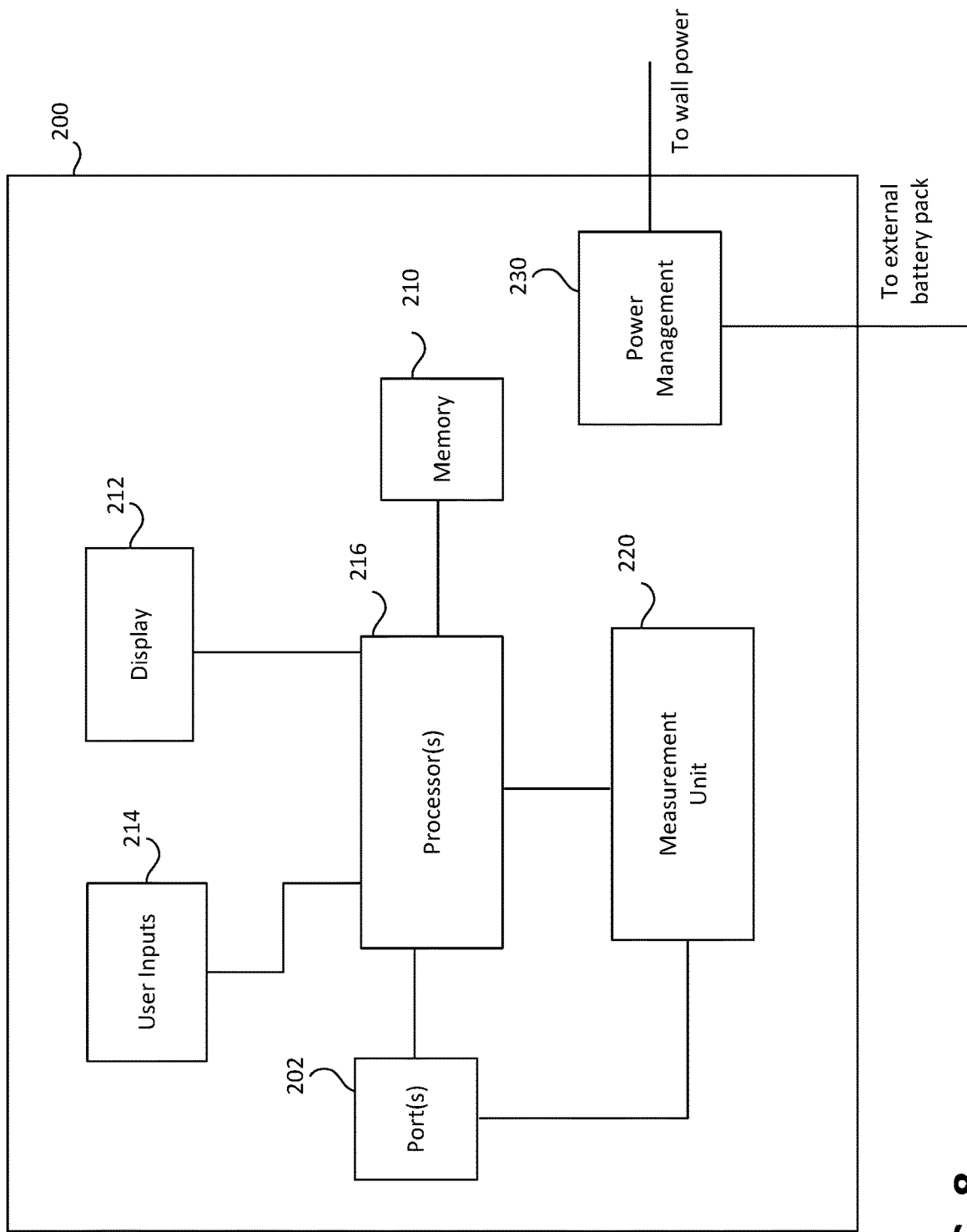
FIG. 8 is a functional block diagram of a test and measurement instrument including a power management circuit for coupling to a removable battery pack according to embodiments of the disclosure.

FIG. 8 is a block diagram of example components of a test and measurement instrument 200, such as an oscilloscope, that receives power through a wired connection to a wall outlet, or from an external battery pack, as described above. The test and measurement instrument 200 may be an example of the instruments 10 or 100 described above. The test and measurement instrument 200 includes one or more ports 202, which may be any electrical signaling medium. The ports 202 may include receivers, transmitters, and/or transceivers. Each port 202 is a channel of the test and measurement instrument 200. The ports 202 are coupled with one or more processors 216 to process the signals and/or waveforms received at the ports 202 from one or more devices under test (DUTs). Although only one processor 216 is shown in FIG. 8 for ease of illustration, as will be understood by one skilled in the art, multiple processors 216 of varying types may be used in combination, rather than a single processor 216.

The ports 202 can also be connected to a measurement unit 220 in the test instrument 200, either through the processor 216 or through a direct connection. The measurement unit 220 can include any component capable of measuring aspects (e.g., voltage, amperage, amplitude, pulse width, etc.) of a signal received via ports 202. The test and measurement instrument 200 may include additional hardware and/or processors, such as conditioning circuits, analog to digital converters, and/or other circuitry to convert a received signal to a waveform for further analysis. The resulting waveform can then be stored in a memory 210, as well as displayed on a display 212.

The one or more processors 216 may be configured to execute instructions from memory 210 and may perform any methods and/or associated steps indicated by such instructions, such as displaying and modifying the input signals received by the instrument. Memory 210 may be implemented as processor cache, random access memory (RAM), read only memory (ROM), solid state memory, hard disk drive(s), or any other memory type. Memory 210 acts as a medium for storing data, computer program products, and other instructions.

User inputs 214 are coupled to the processor 216. User inputs 214 may include a keyboard, mouse, touchscreen, and/or any other controls employable by a user to set up and control the instrument 200. User inputs 214 may include a graphical user interface on the display 212. User inputs 214 may further include programmatic inputs from the user on the instrument 200, or from a remote device. The display 212 may be a digital screen or any other monitor to display menus, waveforms, measurements, and other data to a user. While the components of test instrument 200 are depicted as being integrated within test and measurement instrument 200, it will be appreciated by a person of ordinary skill in the art that any of these components can be external to test instrument 200 and can be coupled to test instrument 200 in any conventional manner (e.g., wired and/or wireless communication media and/or mechanisms). For example, in some embodiments, the display 212 may be remote from the test and measurement instrument 200, or the instrument may be configured to send output to a remote device in addition to displaying it on the instrument 200. In further embodiments, output from the measurement instrument 200 may be sent to or stored in remote devices, such as cloud devices, that are accessible from other machines coupled to the cloud devices.

The test and measurement instrument 200 also includes a power management system 230 that provides power to operation the instrument 200. As described above, the instrument 200 may be coupled to wall power, also known as AC Mains, which provides an Alternating Current power typically having an operating voltage of 110-240 Volts, at 50-60 Hz. The power management system 230 is also optionally coupled to an external battery pack and may include the power management components described above with reference to FIG. 7. As described in detail above, the power management system 230 determines whether the external battery pack is connected to the instrument 200. The instrument 200 may charge the cells in the external battery pack, or receive power to operate the instrument 200, depending on the present power capacity of the external battery pack, as described above.

Aspects of the disclosure may operate on a particularly created hardware, on firmware, digital signal processors, or on a specially programmed general purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable, or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. A configuration of the technologies may include any one or more, and any combination of, the examples described below.

Example 1 is a test system, including a test and measurement instrument, having one or more inputs for receiving one or more signals to be measured or tested, a display for outputting measurement results or test results, one or more processors for operating the instrument, a chassis housing the instrument, and a power connection to receive power for powering the one or more processors from a wall connection, in which the test and measurement instrument includes no battery or power source for powering the one or more processors within the chassis of the instrument. The test system also includes an external battery pack separate from the test and measurement instrument and structured to mechanically and electrically couple to and decouple from the test and measurement instrument, the external battery pack including a DC power source for powering the one or more processors.

Example 2 is a test system according to Example 1, in which the external battery pack further comprises a detection circuit structured to detect whether the external battery pack is electrically coupled to the test and measurement instrument.

Example 3 is a test system according to any of the above Examples, in which the external battery pack further comprises a detection circuit structured to determine a discharge state of batteries contained within the external battery pack.

Example 4 is a test system according to Example 3, in which the test and measurement instrument includes a power routing function that is determined by an output of the detection circuit in the external battery pack.

Example 5 is a test system according to any of the above Examples, further comprising a communication bus coupled between the test and measurement instrument and the external battery pack to transfer power management information between the test and measurement instrument and the external battery pack.

Example 6 is a test system according to any of the above Examples, in which the external battery pack includes removable cells.

Example 7 is a test system according to Example 6, in which the external battery pack includes two removable cells, and in which one of the cells may be removed from the external battery pack while the external battery pack is powering the one or more processors.

Example 8 is a test system according to any of the above Examples, in which the external battery pack includes Video Electronics Standards Association (VESA) mounts.

Example 9 is a test system according to any of the above Examples, in which the external battery pack includes one or more hand grips structured to provide grip affordance.

Example 10 is a test system according to Example 9, in which the external battery pack comprises a relatively planar rear surface, and in which the one or more hand grips are formed as recesses within the relatively planar rear surface.

Example 11 is a test system according to Example 9, in which the one or more hand grips include a side wall having an acute angle with reference to a portion of the hand grip.

Example 12 is test and measurement instrument, including one or more inputs for receiving one or more signals to be measured or tested, a display for outputting measurement results or test results, one or more processors for operating the instrument, a chassis housing the instrument, a power connection to receive power for powering the one or more processors from a wall connection, and a DC receiving circuit that detects whether the test and measurement instrument is coupled to a DC power source other than the wall connection that is external to the chassis housing of the instrument.

Example 13 is a test and measurement instrument according to Example 12, in which the test and measurement instrument includes no battery for powering the one or more processors within the chassis of the instrument.

Example 14 is a test system according to any of the above Examples 12-13, in which the test and measurement instrument routes power from either the wall connection or the DC power source to the one or more processors depending on a state of the DC receiving circuit.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

We claim:

1. A test system, comprising:
a test and measurement instrument, including:
one or more inputs for receiving one or more signals to be measured or tested from one or more devices under test (DUTs),
a display for outputting measurement results or test results,
one or more processors for operating the instrument,
a chassis housing the instrument,
a power connection to receive power for powering the one or more processors from a wall connection,
a battery detect switch coupled between the power connection and the one or more processors, and
in which the test and measurement instrument includes no battery for powering the one or more processors within the chassis of the instrument; and
an external battery pack separate from the test and measurement instrument and the one or more DUTs, the external battery pack structured to mechanically and electrically couple to and decouple from the test and measurement instrument, the external battery pack including:
one or more removable battery cells for powering the one or more processors,
a detection circuit structured to determine whether the external battery pack is electrically coupled to the test and measurement instrument, and to determine an insertion of, and a discharge state of, the one or more removeable battery cells;

in which the battery detect switch is configured to, in a first state, route the power from the power connection to the one or more processors and, in a second state, route the power from the power connection to the external battery pack;

in which the battery detect switch is configured to switch to the first state when the external battery pack is electrically decoupled from the test and measurement instrument; and in which the detection circuit is further configured to cause the battery detect switch to switch to the second state when the external battery pack is electrically coupled to the test and measurement instrument and at least one of the one or more removeable battery cells is inserted and has sufficient charge to power the one or more processors.

2. The test system according to claim 1, in which the external battery pack further comprises:

a power source switch structured to route the power received from the test and measurement instrument; and a path controller configured to, when the external battery pack is electrically coupled to the test and measurement instrument but none of the one or more removable battery cells has sufficient charge to power the one or more processors, cause the power source switch to route the power from the test and measurement instrument back to the test and measurement instrument to power the one or more processors.

3. The test system according to claim 1, further comprising a communication bus coupled between the test and measurement instrument and the external battery pack to transfer power management information between the test and measurement instrument and the external battery pack.

4. The test system according to claim 1, in which the external battery pack includes one or more slots for the one or more removable battery cells.

5. The test system according to claim 4, in which the external battery pack includes two removable battery cells, and in which one of the battery cells may be removed from the external battery pack while the external battery pack is powering the one or more processors.

6. The test system according to claim 1, in which the external battery pack includes Video Electronics Standards Association (VESA) mounts.

7. The test system according to claim 1, in which the external battery pack includes one or more hand grips structured to provide grip affordance.

8. The test system according to claim 7, in which the external battery pack comprises a relatively planar rear surface, and in which the one or more hand grips are formed as recesses within the relatively planar rear surface.

9. The test system according to claim 7, in which the one or more hand grips include a side wall having an acute angle with reference to a portion of the hand grip.

* * * * *